R. H. FENLEY.
PUNCTURE PROOF AUTO TIRE.
APPLICATION FILED MAY 19, 1920
1,381,815.
Patented June 14, 1921.
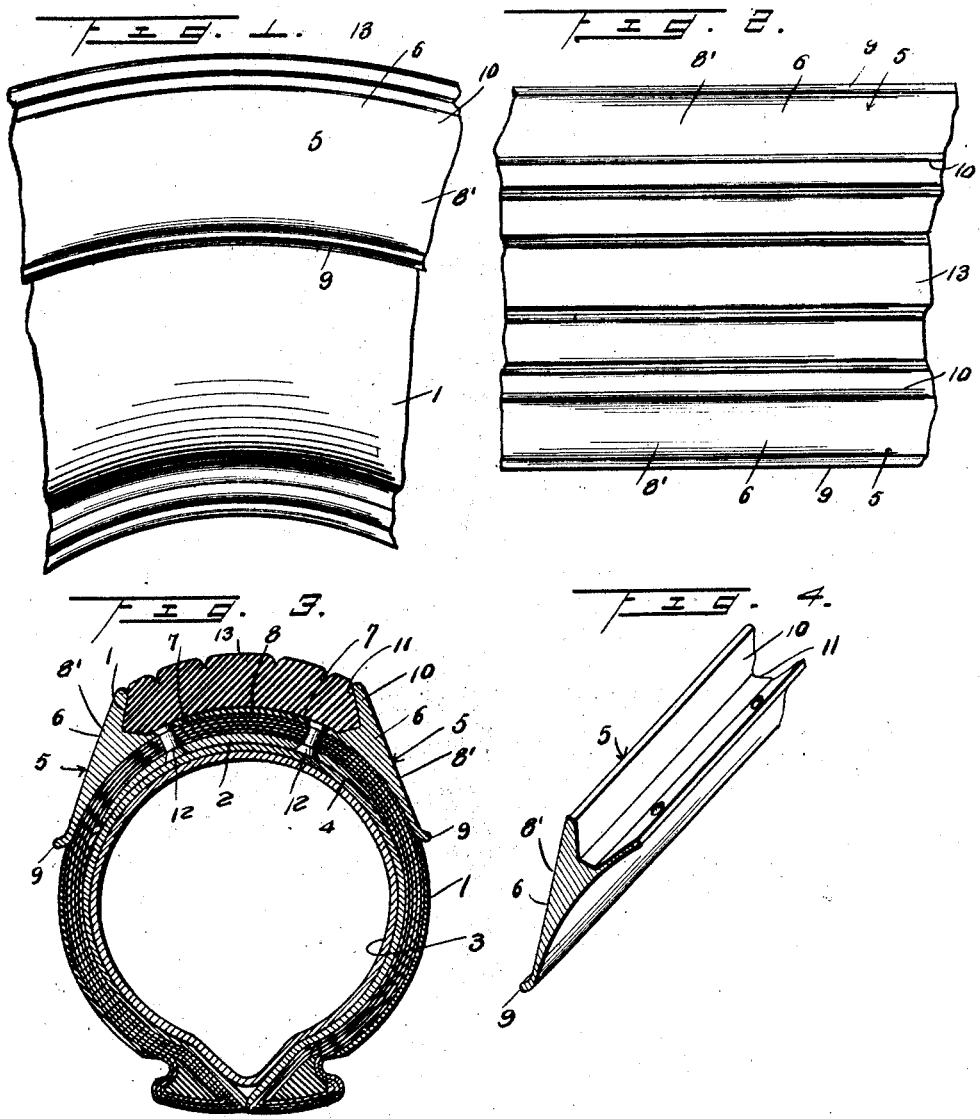
INVENTOR.
R. H. Fenley
BY
ATTORNEY.

UNITED STATES PATENT OFFICE.

ROBERT H. FENLEY, OF FORT WORTH, TEXAS.

PUNCTURE-PROOF AUTO-TIRE.

1,381,815.  Specification of Letters Patent.  Patented June 14, 1921.

Application filed May 19, 1920. Serial No. 382,661.

*To all whom it may concern:*

Be it known that I, ROBERT H. FENLEY, a citizen of the United States, residing at Fort Worth, in the county of Tarrant and State of Texas, have invented certain new and useful Improvements in Puncture-Proof Auto-Tires; and I do hereby declare the following to be a full, clear, and exact description of the invention, such as will enable others skilled in the art to which it appertains to make and use the same.

This invention relates to new and useful improvements in tires and has for its primary object the provision of means in the carcass of the tire that will obviate punctures and blow-outs and will add to the durability or wearing qualities of said tire.

Another object of this invention is the provision of protector plates secured to the carcass and adapted to protect and strengthen the walls of said tire which are so shaped as to aid in securing the tread to the carcass.

A further object of this invention is the provision of a tire of the above stated character which shall be simple, durable, and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention reference is to be had to the following description and accompanying drawing, in which:

Figure 1 is a fragmentary side elevation illustrating a tire constructed in accordance with my invention, Fig. 2 is a fragmentary plan view illustrating the same, Fig. 3 is a transverse sectional view illustrating the same, Fig. 4 is a fragmentary perspective view of one of the protector plates.

Referring in detail to the drawing, the numeral 1 designates the carcass of a tire constructed from rubberized fabric and has secured within the same an armor plate 2 which is transversely curved to conform to the contour of the carcass and is of an increased thickness directly under the tread portion of the carcass and tapers gradually toward each edge. The armor plate is constructed from any material suitable for the purpose and its object is to prevent nails and the like that may pass through the carcass from injuring the usual pneumatic tube 3 located in the carcass. An inner liner 4 is cemented or otherwise secured to the inner face of the carcass and overlies the armor plate 2 and provides a smooth surface for the pneumatic tube to engage.

Protector plates 5 are secured to each side of the carcass 1 and upon the outer face thereof and include bodies 6 which have their inner walls or faces curved to conform to the contour of the carcass and have their opposing edges 7 relatively spaced to expose the tread portion 8 of the carcass. Each body 6 is increased in thickness, as shown at 8′, and tapers toward its inner edge which is slightly curved outwardly to form a bead 9 to prevent said body from cutting or chafing the wall of the carcass during the expansion and contraction of the tire. The thickest portion of the body has formed thereon a radially extending flange 10 which coöperates with the outer portion of said body in forming a tread receiving channel 11. The outer portion of said body has counter-sunk openings to receive rivets 12 that extend through the carcass and armor plate 2 for holding said body and armor plate firmly to the carcass.

The radially extending flanges 10 of the protector plates are relatively spaced to receive a tread 13 constructed from rubber or any other material suitable for the purpose and which is of a considerable thickness and rests upon the outer portions of said bodies between the flanges and engages the exposed tread portion of the carcass and is cemented or otherwise secured thereto, thus it will be seen that the flanges will prevent any tendency of the tread to move or shift laterally of the carcass and also will prevent the edges of the tread from being injured by engaging stones or other obstacles. Further it is to be noted that the bodies or protector plates prevent the walls of the carcass from being injured by coming in contact with obstacles and also will prevent sharp obstacles from piercing the walls of said carcass.

The armor plate 2 and the protector plates are adapted to prevent rim cutting of the walls in case the tire is run on when deflated as said plates will assume the weight of the vehicle.

While I have shown and described the preferred embodiment of my invention, it is to be understood that minor changes in construction, combination and arrangement of parts may be made without departing from the spirit and scope of the invention as claimed.

Having thus described my invention, what I claim is:

A tire including a carcass, circumferentially extending protector plates secured to the carcass on each side of the tread portion of the latter, said plates having thickened portions, radially extending flanges formed on the thickened portions of the plates and spaced from the outer edges of said plates, and a tread positioned between the flanges and resting on the plate and cemented to the tread portion of the carcass.

In testimony whereof I affix my signature in presence of two witnesses.

ROBERT H. FENLEY.

Witnesses:
ROBERT E. CRITTENDEN,
J. W. HAMILTON.